US008585484B2

(12) United States Patent
Louie

(10) Patent No.: US 8,585,484 B2
(45) Date of Patent: Nov. 19, 2013

(54) WAGERING GAME HAVING CONTINUOUS FREE BONUS GAME PLAYS

(75) Inventor: Daniel P. Louie, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 48 days.

(21) Appl. No.: 13/275,886

(22) Filed: Oct. 18, 2011

(65) Prior Publication Data

US 2012/0094739 A1 Apr. 19, 2012

Related U.S. Application Data

(60) Provisional application No. 61/394,162, filed on Oct. 18, 2010.

(51) Int. Cl.
*A63F 13/00* (2006.01)

(52) U.S. Cl.
USPC .......... 463/20; 463/25

(58) Field of Classification Search
None
See application file for complete search history.

(56) References Cited

U.S. PATENT DOCUMENTS

| | | | | |
|---|---|---|---|---|
| 4,837,728 | A | 6/1989 | Barrie et al. | 364/412 |
| 5,393,057 | A | 2/1995 | Marnell, II | 273/85 |
| 5,564,700 | A | 10/1996 | Celona | 463/27 |
| 5,655,961 | A | 8/1997 | Acres et al. | 463/27 |
| 5,796,716 | A | 8/1998 | Smith | 370/207 |
| 5,855,515 | A | 1/1999 | Pease et al. | 463/27 |
| 6,048,269 | A | 4/2000 | Burns et al. | 463/25 |
| 6,068,553 | A | 5/2000 | Parker | 463/27 |
| 6,089,976 | A | 7/2000 | Schneider et al. | 463/16 |
| 6,089,978 | A | 7/2000 | Adams | 463/20 |
| 6,165,071 | A | 12/2000 | Weiss | 463/24 |
| 6,190,255 | B1 | 2/2001 | Thomas et al. | 463/20 |
| 6,319,125 | B1 | 11/2001 | Acres | 463/25 |
| 6,592,457 | B1 | 7/2003 | Frohm et al. | 463/16 |
| 6,599,190 | B2 | 7/2003 | Osawa | 463/20 |
| 6,599,193 | B2 | 7/2003 | Baerlocher et al. | 463/27 |
| 6,605,001 | B1 | 8/2003 | Tarantino | 463/22 |
| 6,638,164 | B2 * | 10/2003 | Randall et al. | 463/20 |
| 6,780,111 | B2 | 8/2004 | Cannon et al. | 463/25 |
| 7,011,581 | B2 | 3/2006 | Cole et al. | 463/16 |
| 7,052,392 | B2 | 5/2006 | Tessmer et al. | 463/16 |
| 7,169,047 | B2 | 1/2007 | Benbrahim | 463/25 |
| 7,326,115 | B2 | 2/2008 | Baerlocher | 463/25 |
| 7,393,277 | B2 | 7/2008 | Jackson | 463/20 |
| 7,513,828 | B2 | 4/2009 | Nguyen et al. | 463/26 |
| 7,568,973 | B2 | 8/2009 | Iddings et al. | 463/25 |
| 7,585,223 | B2 | 9/2009 | Iddings et al. | 463/27 |
| 7,601,061 | B2 | 10/2009 | Jackson | 463/20 |

(Continued)

FOREIGN PATENT DOCUMENTS

WO WO 2005/010833 2/2005

*Primary Examiner* — Dmitry Suhol
*Assistant Examiner* — Jay Trent Liddle
(74) *Attorney, Agent, or Firm* — Nixon Peabody LLP

(57) ABSTRACT

A method of conducting a wagering game having a basic game and a continuous bonus game includes continually displaying a plurality of free plays of the continuous bonus game. The act of continually displaying the plurality of free plays includes the act of displaying a randomly selected outcome for each of the plurality of free plays of the continuous bonus game. While continually displaying the plurality of free plays of the continuous bonus game, a session of the basic game is conducted on a wagering game machine. The session includes (i) receiving a wager to play the basic game on the wagering game machine and (ii) in response to the receiving of the wager, a randomly selected outcome of the basic game is displayed.

24 Claims, 7 Drawing Sheets

(56) References Cited

U.S. PATENT DOCUMENTS

| | | | | |
|---|---|---|---|---|
| 7,601,062 | B2 | 10/2009 | Cole et al. | 463/20 |
| 7,607,976 | B2 | 10/2009 | Baerlocher et al. | 463/16 |
| 7,607,977 | B2 | 10/2009 | Baerlocher et al. | 463/16 |
| 7,621,809 | B2 | 11/2009 | Baerlocher et al. | 463/16 |
| 7,666,081 | B2 | 2/2010 | Baerlocher et al. | 463/16 |
| 7,666,094 | B2 | 2/2010 | Baerlocher et al. | 463/27 |
| 7,674,178 | B2 | 3/2010 | Baerlocher et al. | 463/27 |
| 7,677,972 | B2 | 3/2010 | Baerlocher et al. | 463/27 |
| 7,682,245 | B2 | 3/2010 | Nguyen | 463/25 |
| 7,682,248 | B2 | 3/2010 | Baerlocher et al. | 463/27 |
| 7,727,070 | B2 | 6/2010 | Shelby et al. | 463/42 |
| 7,753,770 | B2 | 7/2010 | Walker et al. | 463/16 |
| 7,909,693 | B2 | 3/2011 | Kammler et al. | 463/25 |
| 7,997,981 | B2 | 8/2011 | Rowe et al. | 463/27 |
| 8,371,919 | B2 * | 2/2013 | Hornik et al. | 463/16 |
| 2003/0064779 | A1 | 4/2003 | Suda | 463/20 |
| 2003/0069057 | A1 | 4/2003 | DeFrees-Parrott | 463/16 |
| 2010/0029363 | A1 | 2/2010 | Hoffman et al. | 463/20 |

* cited by examiner

WAGERING GAME HAVING CONTINUOUS FREE BONUS GAME PLAYS

CROSS-REFERENCE TO RELATED APPLICATION

This application claims the benefit of U.S. Provisional Application No. 61/394,162, filed Oct. 18, 2010, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a gaming apparatus and methods for playing wagering games having continuous free bonus game plays.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

SUMMARY OF THE INVENTION

According to one aspect of the present invention, a method of conducting a wagering game on a gaming terminal having a basic game and a continuous bonus game includes continually displaying free plays of the continuous bonus game on a secondary display of a wagering game machine. The continually displaying free plays includes displaying a randomly selected outcome for each of the free plays of the continuous bonus game and displaying a respective bonus award associated with each of the randomly selected outcomes of the free plays of the continuous bonus game. While continually displaying the free plays of the continuous bonus game, a session of the basic game is conducted on a wagering game machine. The session includes receiving a wager from a player to play the basic game on the wagering game machine and in response to the receiving, a randomly selected outcome of the basic game is displayed on a primary display of the wagering game machine substantially simultaneously to the displaying the randomly selected outcomes of the free plays of the continuous bonus game on the secondary display. The acts of receiving and displaying the randomly selected outcome of the basic game are repeated at least once. In response to the randomly selected outcome of the basic game being a winning outcome, a basic award is awarded to the player. The continuous bonus game is triggered such that the player is eligible to be awarded one of the respective bonus awards for a predetermined number of free plays of the continuous bonus game. The randomly selected outcome for one of the predetermined number of the free plays of the continuous bonus game is displayed. The respective bonus award associated with the one of the predetermined number of the free plays of the continuous bonus game is displayed. In response to the displayed randomly selected outcome for the one of the predetermined number of the free plays of the continuous bonus game being a winning outcome, the respective bonus award associated with the one of the predetermined number of the free plays of the continuous bonus game is awarded to the player.

According to another aspect of the invention, a method of conducting a wagering game having a basic game and a continuous bonus game includes continually displaying a plurality of free plays of the continuous bonus game. The act of continually displaying the plurality of free plays includes the act of displaying a randomly selected outcome for each of the plurality of free plays of the continuous bonus game. While continually displaying the plurality of free plays of the continuous bonus game, a session of the basic game is conducted on a wagering game machine. The session includes (i) receiving a wager to play the basic game on the wagering game machine and (ii) in response to the receiving of the wager, a randomly selected outcome of the basic game is displayed.

According to one aspect of the present invention, a gaming system for playing a wagering game having a basic game and a continuous bonus game includes a secondary display, an input device, a primary display, and one or more controllers. The secondary display is for continually displaying free plays of a second plurality of symbols that continually indicate randomly selected outcomes for the continuous bonus game. One or more of the randomly selected outcomes for the continuous bonus game is a winning continuous bonus game outcome that is associated with a bonus award. The input device is configured to receive a wager from a player. The primary display is for displaying a first plurality of symbols that indicate randomly selected outcomes for the basic game. One or more of the randomly selected outcomes for the basic game is a winning basic game outcome that is associated with a basic award. The one or more controllers is operative to: (i) conduct the basic game on the primary display, (ii) conduct the continuous bonus game on the secondary display, (iii) provide the basic award to the player based on the randomly selected outcomes for the basic game, and (iv) provide the bonus award to the player responsive to both a continuous bonus game triggering event in the basic game and a winning continuous bonus game outcome in the continuous bonus game.

According to another aspect of the invention, a method of conducting a wagering game having a basic game and a continuous bonus game includes conducting a session of the basic game on a wagering game machine. The session includes (i) receiving a wager to play the basic game on a wagering game machine, (ii) in response to the receiving of the wager, displaying a randomly selected outcome of the basic game, and (iii) awarding a basic award in response to the randomly selected outcome of the basic game being a winning basic game outcome. The continuous bonus game is triggered such that a player is eligible to be awarded a bonus award for a predetermined number of plays of the bonus game. In response to the triggering, a randomly selected outcome for each of the predetermined number of plays of the continuous bonus game is displayed. The session of the basic game is ongoing while the continuous bonus game is triggered such that the ongoing session of the basic game allows a player to play the basic game while the player is eligible to be awarded one of the respective bonus awards for the predetermined number of the plays of the bonus game.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
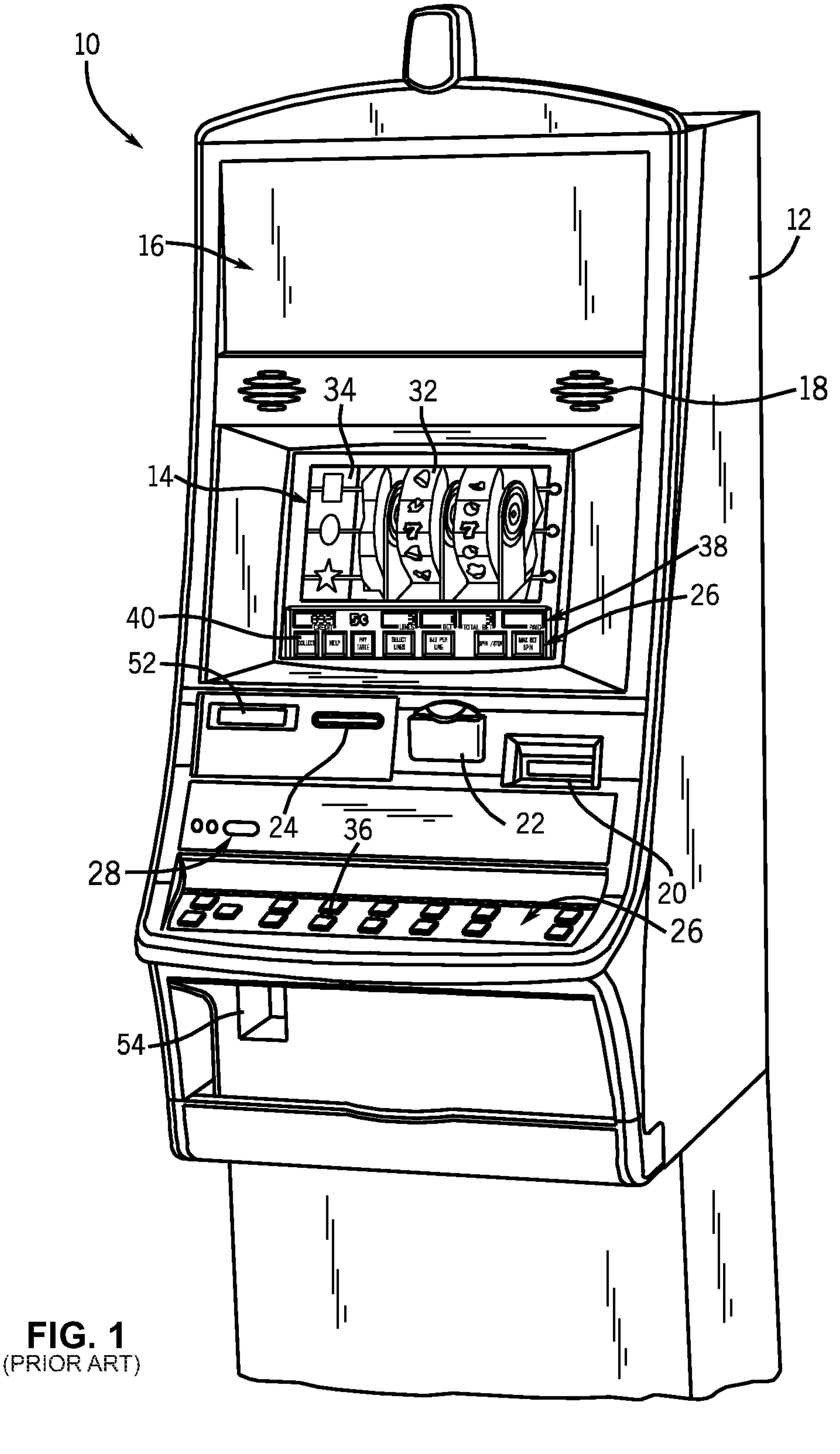
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG.

1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
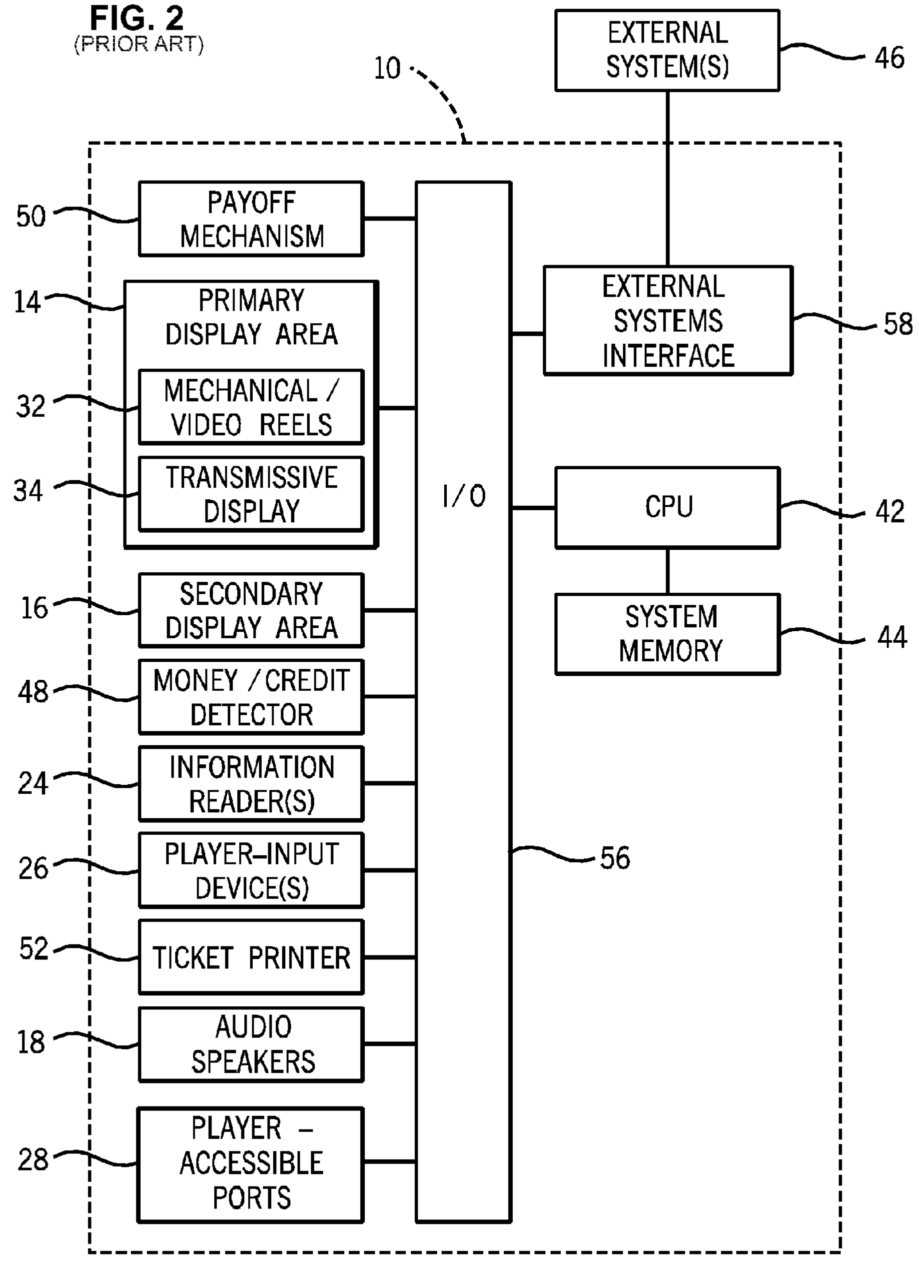
FIG. 2 (PRIOR ART)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
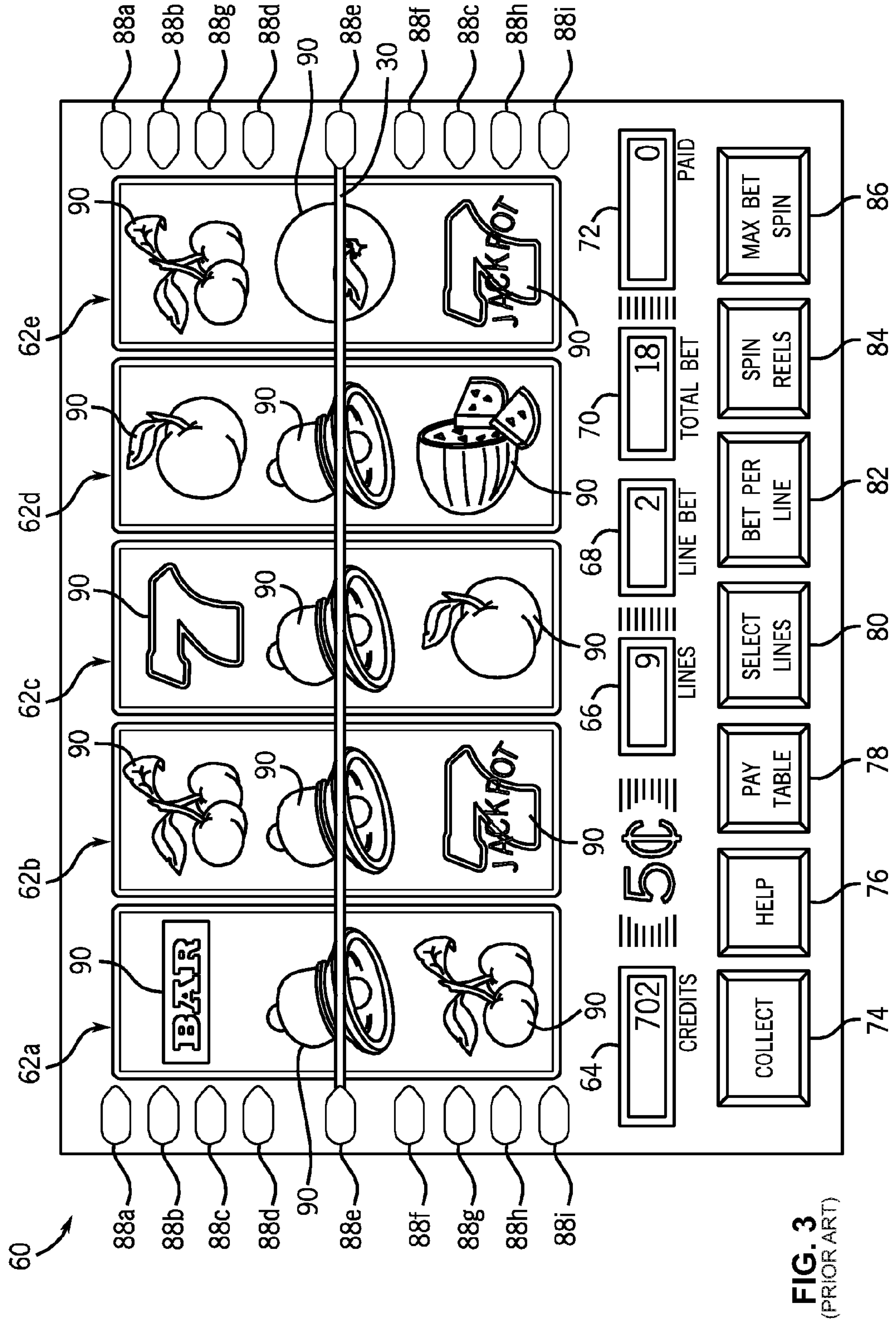
FIG. 3 (PRIOR ART)
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager and, optionally, a separate instruction to initiate the wagering game via one or more player-input devices 26. The controller 42, the external system 46, or both, in alternative embodiments, operate(s) to execute a wagering game program causing the primary display area 14 to display the wagering game and a randomly determined outcome for the wagering game.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc. The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

As will be described in detail below in reference to FIGS. 4-7, a wagering game according to the present disclosure generally includes a basic game and a continuous bonus game. The basic game is displayed on a primary display and the continuous bonus game is typically, but not necessarily, displayed on a secondary display. Free plays of the continuous bonus game are displayed, for example, while a player conducts a session of the basic wagering game (e.g., it is displayed even when a player loses a basic wagering game).

Figure 4:
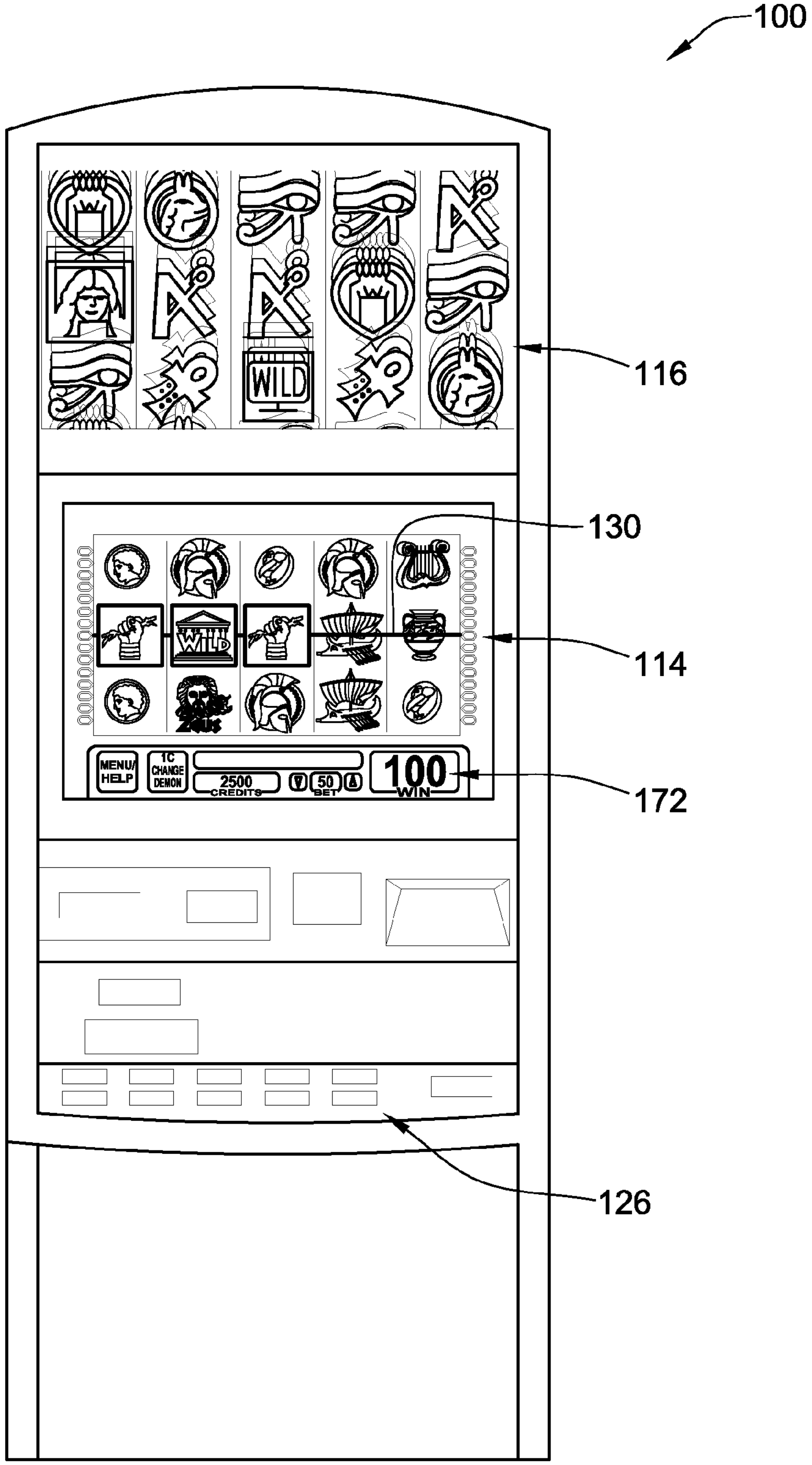
FIG. 4 is a front view of a free-standing gaming terminal including a primary display displaying a winning outcome in a basic-game and a secondary display displaying a free play of a continuous bonus game, according to an embodiment of the present invention.

Referring to FIG. 4, a front view of a free-standing gaming terminal 100 including a primary display 114 displaying a winning outcome in a basic wagering game and a secondary display 116 displaying a free play of a continuous bonus game is shown. The basic wagering game and the continuous bonus game are reel spinning type games or slot games.

A player begins play of a basic wagering game by providing a wager. A player can operate or interact with the basic wagering game using the one or more player-input devices 126, which are the same as, or similar to, the player-input devices 26 described above. One or more controllers operate to execute a basic wagering game program causing the primary display 114 to display the basic wagering game that includes a plurality of visual elements (e.g., symbols). The randomly selected basic wagering game outcome is then revealed to the player in due course following initiation of the basic wagering game.

As shown in FIG. 4, the basic wagering game outcome is a winning outcome, which is indicated by the highlighted basic-wagering-game payline 130. An award meter 172 displays an award associated with the winning outcome to the player. As shown, the player won 100 credits for achieving the displayed winning outcome in the basic wagering game. The player can continue to play a session of the basic wagering game by continuing to provide wagers after each complete play or spin of the basic wagering game. The session of the basic wagering game continues while the player provides wagers and ends when the player runs out of credits and fails to supply additional credits, or when the player cashes out taking all of the available credits as is known in the art. Put another way, a session includes wagering game play spanning the initiation of wagering game play until the player's conclusion of wagering game play.

While the player conducts the session of the basic wagering game, free plays of the continuous bonus game are continually displayed on the secondary display 116 of the gaming terminal 100 (or other designated display). That is, the secondary display 116 continually displays free plays or spins of a continuous bonus game, one after the other, independent of the basic wagering game. Thus, these free plays are being displayed while the player conducts the various wagering games in the player's session.

The free plays of the continuous bonus game are "free" in the sense that a player is not required to provide an additional wager above what might be required to play the basic wagering game, wherein the player may then trigger and/or play the continuous bonus game as described below. To be eligible for any award associated with the displayed outcomes of the free plays of the continuous bonus game, a player must first conduct the basic wagering game to have an opportunity therein to become eligible (e.g., by triggering the continuous bonus game) to be awarded a bonus award in the continuous bonus game. Additionally, the free plays are "free" as they are displayed on the secondary display 116 when a player is eligible to be awarded a bonus award and when the player is not eligible to be awarded a bonus award.

As shown in FIG. 4, the secondary display 116 is displaying a free play of the continuous bonus game wherein all of the reels are still spinning and the outcome of the free play has not yet been revealed. FIG. 4 also illustrates that the basic wager game and the continuous bonus game do not have to be synced and can operate independently of one another. Any portion of the basic wagering game can be displayed on the primary display 114 while any portion of the continuous bonus game is displayed on the secondary display 116. For example, as shown in FIG. 4, the basic wagering game displays a winning outcome while the continuous bonus game displays spinning reels at the beginning of a spin of the continuous bonus game.

Each of the displayed free plays of the continuous bonus game includes the displaying of a randomly selected outcome. The free plays or spins of the continuous bonus game are displayed without regard to whether a player of the basic wagering game is eligible to win a bonus award. That is, the free plays are displayed even though the player did not trigger the continuous bonus game.

Figure 5:
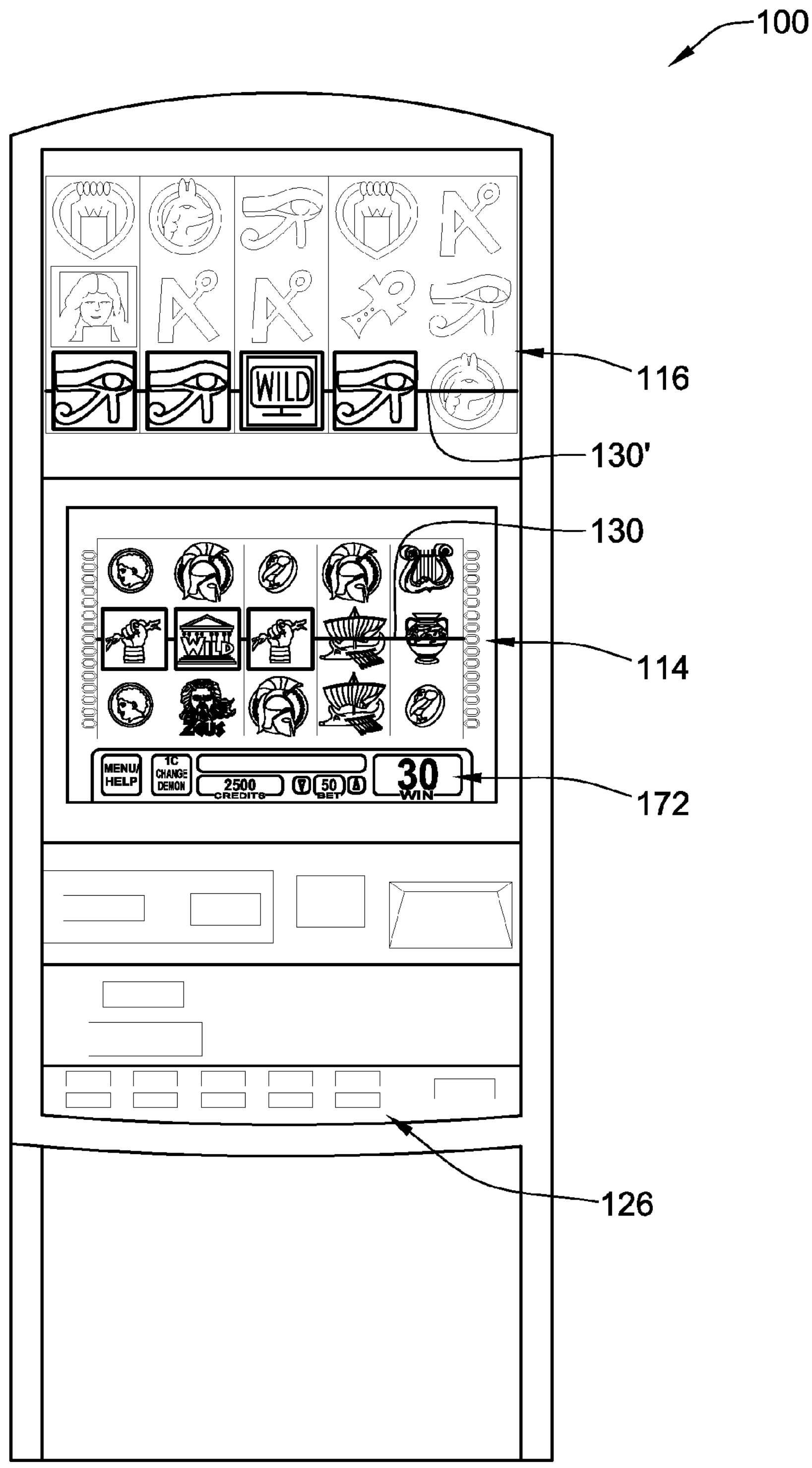
FIG. 5 is a front view of the free-standing gaming terminal of FIG. 4 where the secondary display is displaying a winning outcome for the free play of the continuous bonus game and the primary display is displaying a winning outcome for the basic game.
Figure 6:
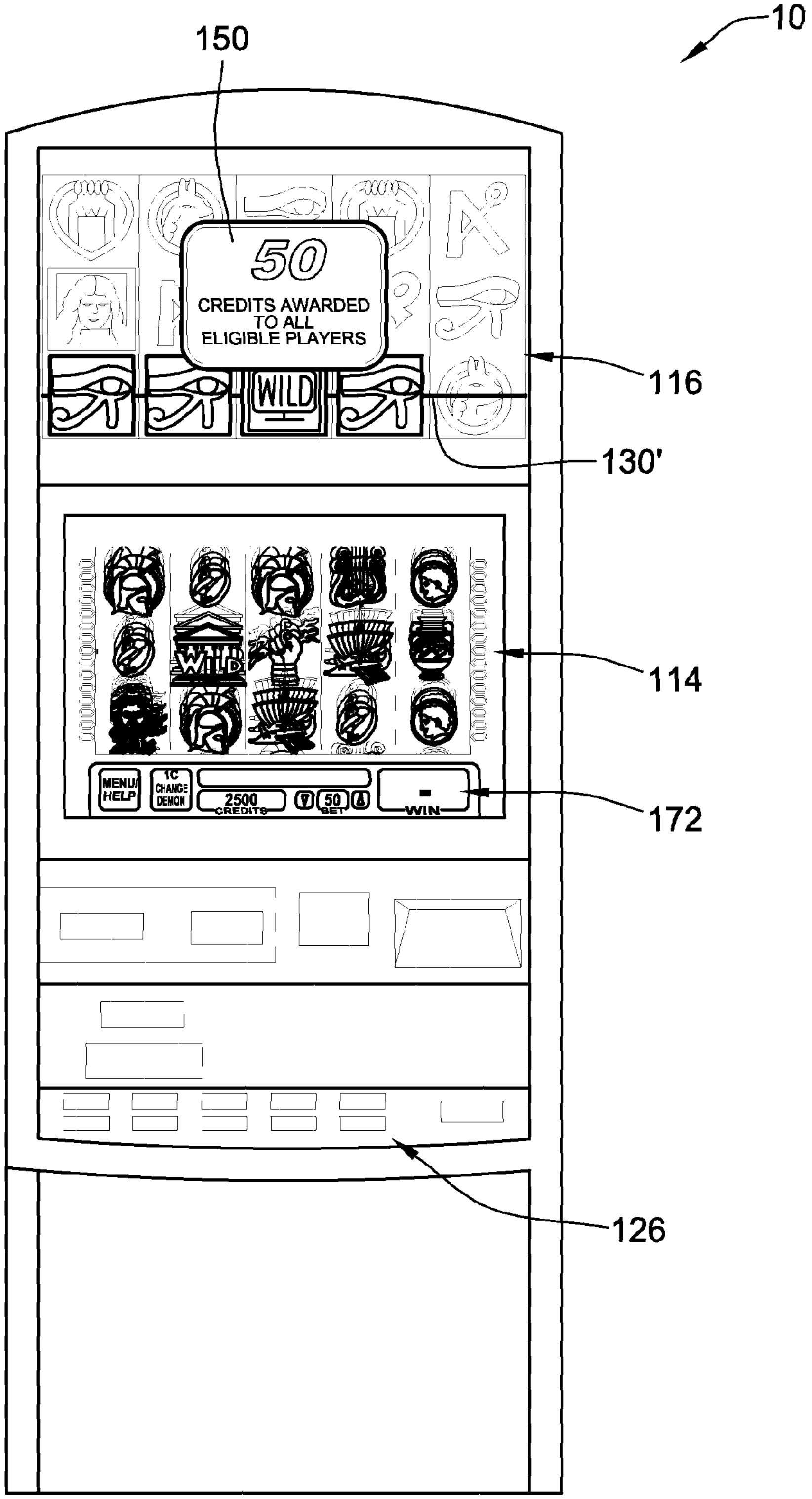
FIG. 6 is a front view of the free-standing gaming terminal of FIG. 5 where the secondary display further displays a bonus award associated with the displayed winning outcome for the free play of the continuous bonus game for all eligible bonus-game players and the primary display displays a play of the basic game.

Generally referring to FIGS. 4-6, for illustrative purposes, a player of the gaming terminal 100 in FIGS. 4-6 is not eligible (continuous bonus game not triggered) to win a bonus award in the continuous bonus game. Even if a winning outcome of the continuous bonus game is displayed on the secondary display 116, the player will not be awarded an associated bonus award. However, as will be explained in detail below, after the continuous bonus game is triggered, the player is eligible to win bonus award(s) displayed in association with designated free plays (e.g., free spins) of the continuous bonus game.

As shown in FIG. 4, a free play of the continuous bonus game is displayed on the secondary display 116. Referring to FIG. 5, an outcome of the free play of the continuous bonus game shown in FIG. 4 is displayed on the secondary display 116. The outcome is a winning outcome as indicated by the highlighted bonus-wagering-game payline 130'. The secondary display 116 displays the winning outcome (FIG. 5) of the continuous bonus game while the player plays the basic wagering game and is not eligible (continuous bonus game not triggered) to win a bonus award associated with the winning outcome.

While the player plays the basic wagering game, the player can view the secondary display 116, which can indicate (as shown in FIG. 5) that, had the player been eligible for the continuous bonus game at that time, the player would have won a bonus award. The displaying of a winning continuous bonus game outcome (such as in FIG. 5), while the player is not eligible to win an associated bonus award informs the player of the potential awards available to a player of the basic wagering game, should they qualify for the continuous bonus game. In light of this information, it is expected that players will play longer sessions of the basic wagering game.

In addition to the controller's 42 displaying of a winning continuous bonus game outcome (as shown in FIG. 5 via the secondary display 116), an associated bonus award is optionally displayed to the player and/or communicated using other output devices (e.g., speakers, pop-up windows in the primary display 114, etc.). The associated bonus award is displayable to the player, for example, as shown in FIG. 6 via a pop-up window 150 on the secondary display 116. In the example of FIG. 6, the bonus award associated with the displayed winning outcome in FIG. 5 is 50 credits. The pop-up window 150 is displayed to indicate such award has been awarded to all eligible players. Thus, the bonus award is optionally displayed and/or highlighted to the player when a free play of the continuous bonus game results in a winning outcome whether or not any player is actually eligible to receive such bonus award. In the example of FIGS. 4-6 where the player is not eligible (continuous bonus game not triggered) to win a bonus award in the continuous bonus game, the player is not awarded the 50 credits. The player is, however, made aware via the pop-up window 150 that, had the player been eligible (continuous bonus game triggered) for the continuous bonus game, the player would have won the 50 credits.

Thus far, in the illustrative example of FIGS. 4-6, a player of the gaming terminal 100 has not been eligible to win a bonus award because the continuous bonus game was not triggered by the player. The player has merely been able to view winning outcomes of the continuous bonus game on the secondary display 116, as in FIG. 5, and view associated bonus awards on the secondary display 116, as in FIG. 6. A player becomes eligible to win a continuous bonus game award when the continuous bonus game is triggered. The continuous bonus game is able to be triggered off of any predetermined condition satisfied in the basic wagering game, such as but not limited to, one or more predetermined outcomes in the basic wagering game, a predetermined symbol appearing in the basic wagering game outcome, or a mystery trigger.

Once the continuous bonus game is triggered by a predetermined outcome or condition, the player of the basic wagering game becomes eligible to win a bonus award in the continuous bonus game. The player is awarded bonus award if a winning outcome of the continuous bonus game is achieved and displayed on the secondary display 116 for one or more of a predetermined number of free plays of the continuous bonus game. The player remains eligible to win bonus awards during the execution of the predetermined number of free plays of the continuous bonus game. On one embodiment, the triggering of the continuous bonus game gives the player a predetermined number of free plays (e.g., spins) of the continuous bonus game. If one or more of the predetermined free plays results in a winning continuous bonus game outcome, the player will be awarded a bonus award for each winning continuous bonus game outcome. When the predetermined number of free plays expire (all of the free plays have been conducted and displayed), the player's eligibility ends. The player can then resume play of the session of the basic wagering game, wherein the player is again able to trigger the continuous bonus game allowing achievement of a predetermined outcome or condition as described above.

Figure 7:
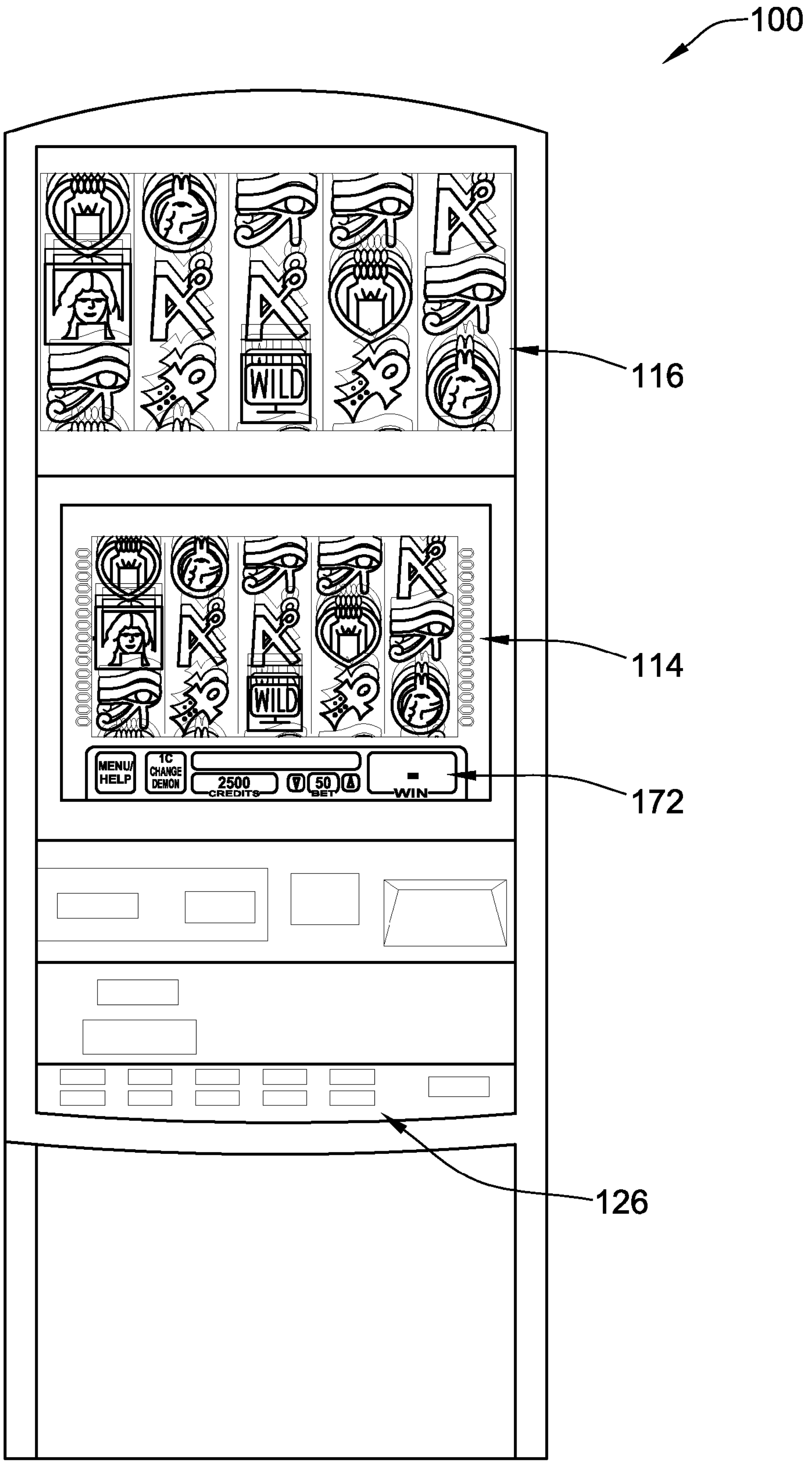
FIG. 7 is a front view of the free-standing gaming terminal of FIG. 4 where the secondary display is displaying a free play of the continuous bonus game and the primary display is displaying the same free play of the bonus game.

Referring to FIG. 7, the continuous bonus game is triggered, which can optional cause the continuous bonus game displayed on the secondary display 116 to be copied down onto the primary display 114 such that the continuous bonus game is displayed on the secondary display 116 and on the primary display 114. As the primary display 114 is no longer displaying the basic wagering game, the triggering of the continuous bonus game essentially pauses play of the basic wagering game during the player's eligibility for the continuous bonus game.

The duplication of the continuous bonus game on both displays 114, 116 highlights to the player, in this example, that the continuous bonus game is triggered. The continuous bonus game remains copied on the primary display 114 until the player's eligibility for the continuous bonus game expires. After the player's eligibility expires, the primary display 114 resumes display of the basic wagering game (the basic wagering game becomes unpaused) and the secondary display 116 will continue to display free plays of the continuous bonus game where the player is not eligible to win associated bonus awards.

In lieu of the duplication of the continuous bonus game on the primary display 114, an indicia such as an upwards pointing arrow can be displayed on the primary display 114 to direct the player's attention upward to the secondary display 116 to indicate that the continuous bonus game was triggered. Various other methods of indicating the triggering of the continuous bonus game are contemplated, such as, for example, a pop-up window on the primary and/or secondary display 114, 116 that indicates the triggering, flashing lights, textual messages, verbal or non-verbal sounds, etc.

While the basic wagering game and the continuous bonus game are shown and described as comprising a slot game, the basic wagering game and/or the continuous bonus game can be other types of wagering games (e.g., a card game, etc.). Moreover, the continuous bonus game may be a different game than the basic wagering game or may yet still be an entirely different type of game.

While the continuous bonus game is described as being continuous while a player conducts a session of the basic wagering game, the continuous bonus game, in at least some embodiments, is configured to display free plays of the continuous bonus game before, during, and/or after a player conducts a session of the basic wagering game on the gaming terminal 100. That is, the free plays are displayed (e.g., as an attract sequence) prior to a player's gaming session, during the player's gaming session, and/or after the player's gaming session.

While a bonus award associated with a winning continuous bonus game outcome is described above and shown in FIG. 6 as being via the pop-up window 150 on the secondary display 116, the associated bonus award can be displayed in a variety of other manners. For example, the associated bonus award can be displayed to a player of the gaming terminal 100 via a pop-up window on the primary display 114, via a pop-up window on the primary display 114 and a pop-up window on the secondary display 116, via a pop-up window on a community display (e.g., a television positioned above a bank of gaming terminals similar to gaming terminal 100), and/or via other means of display in the gaming terminal 100.

While the continuous bonus game is described as being triggered off of any predetermined condition satisfied in the basic wagering game, it is contemplated that the continuous bonus game can be retriggered within the continuous bonus game off of any predetermined condition satisfied in the continuous bonus game, such as but not limited to, one or more predetermined outcomes in the continuous bonus game, a predetermined symbol appearing in the continuous bonus game outcome, or a mystery trigger. The retriggering of the continuous bonus game can extend the player's eligibility for winning bonus awards, such as, for example, by awarding additional free plays and/or additional time of eligibility within the continuous bonus game.

Instead of the triggering of the continuous bonus game resulting in a predetermined number of free plays (e.g., free spins) for the player, it is contemplated that the triggering of a player's eligibility in the continuous bonus game can result in a predetermined amount of time in which the free plays are executed. A clock or timer can appear on one of the displays 114, 116 of the gaming terminal 100 to show the player the amount of remaining time for bonus eligibility. When the predetermined amount of time expires, the player's eligibility ends and the player can return to playing the session of the basic wagering game. In one aspect, the amount of time for each free play of the continuous bonus game to be executed can vary from play-to-play during the period of eligibility. Alternatively or additionally, the amount of time between each play of the free plays during eligibility can vary from play-to-play.

While the above concepts have been described and shown as being implemented using a single gaming terminal 100, it is contemplated that the same game and concepts can be employed using a plurality of gaming terminals, such as in a community game. In a community game embodiment, a gaming system includes a multitude of networked gaming terminals, where each of the gaming terminals is the same as, or similar to, the gaming terminal 100. The same continuous bonus game is displayed to each player of the community game via individual secondary displays, sub-portion(s) of a primary display, and/or one or more community displays viewable to the players. When a winning outcome of the continuous bonus game is achieved, the non-eligible (continuous bonus game not triggered) players of the community game can be made aware that while they were not eligible to win the associated bonus award, other players of the same game on different gaming terminals might have won the displayed bonus award. It is contemplated that in such a community game, a pop-up window or the like can further indicate a number of eligible players that were awarded the associated bonus award.

It is further contemplated that in a community game employing the same game and concepts as described herein a player can trigger continuous bonus game eligibility for one or more other players of the community game. For example, in a community game having 5 players, responsive to one person triggering the community bonus game during play of the basic game, the community bonus game can be triggered for some or all of the five players. For another example, a player can trigger bonus game eligibility for a predetermined partner or player of the community game. In such example, two or more players can be associated such that responsive to the continuous bonus game being triggered for either player, the associated player's continuous bonus game is also triggered.

While the session of the basic wagering game is described and shown as being paused when the continuous bonus game is triggered, it is contemplated that a player can continue to play the basic wagering game (e.g., place wagers in an ongoing basic wagering game) while the predetermined number of free plays of the continuous bonus game are executed during eligibility. In such an alternative embodiment, instead of the duplication of the continuous bonus game on the primary display 114 as shown in FIG. 7, the continuous bonus game remains displayed on the secondary display 116 and the basic wagering game remains displayed on the primary display 114. The ongoing basic wagering game during the player's period of eligibility allows the player to continue to make wagers and play the basic wagering game while the player is eligible to be awarded one or more bonus awards for the predetermined number of the free plays of the continuous bonus game. Thus, the player can potentially achieve winning outcomes and awards in the basic wagering game and the continuous bonus game at substantially the same time.

It is further contemplated that certain outcomes and/or symbols appearing in the basic wagering game can advantageously affect the outcomes and/or bonus awards in the continuous bonus game. For example, if the player achieves a predetermined outcome in the basic wagering game during the period of eligibility (e.g., during the execution of the predetermined number of free plays of the continuous bonus game), any bonus award(s) earned in the continuous bonus game can be increased such as by being multiplied by a bonus multiplier. If the continuous bonus game awards a total bonus award of 200 credits during the player's eligibility and the player achieves the predetermined outcome in the basic wagering game associated with a 3× bonus multiplier, the 200 credits will be multiplied by 3 for a total bonus award of 600 credits. Thus, the ongoing play of the basic wagering game during the player's eligibility for the continuous bonus game resulted in the bonus award being tripled. Had the player decided not to play the basic wagering game when eligible for the continuous bonus game, the player would have only won 200 credits.

As another example, if the player achieves a predetermined outcome in the basic wagering game during the period of eligibility (e.g., during the execution of the predetermined number of free plays of the continuous bonus game), the player's period of eligibility can be increased, such as by adding an addition number of free plays of the continuous bonus game to the predetermined number of free plays of the continuous bonus game. If the player's initial eligibility is for 10 free plays of the continuous bonus game and the player achieves the predetermined outcome in the basic wagering game associated with 5 additional free plays, the 5 additional free plays will be added to the 10 original free plays for a total of 15 free plays of eligibility for the player. Thus, the ongoing play of the basic wagering game during the player's eligibility for the continuous bonus game resulted in the number of free plays being increased from 10 to 15. Had the player decided not to play the basic wagering game when eligible for the continuous bonus game, the player would have only won 10 free plays.

Similarly, as yet another example, if the player achieves a predetermined outcome in the basic wagering game during the period of eligibility (e.g., during the execution of the free plays of the continuous bonus game over a predetermined or randomly determined period of time), the player's period of eligibility can be increased, such as by adding an addition number of increments of time of eligibility for the continuous bonus game to the initial predetermined or randomly determined period of eligibility time for free plays of the continuous bonus game. Thus, if a player's initial eligibility is for 30 seconds of completed free plays of the continuous bonus game and the player achieves a predetermined outcome in the basic wagering game associated with 5 additional seconds, the 5 additional seconds will be added to the end of the initial period of eligibility of 30 seconds. Depending on the cycle of the continuous bonus game, the player in this example may then receive one or two additional continuous bonus game free play outcomes to which an award may be associated. Thus, the ongoing play of the basic wagering game during the player's eligibility for the continuous bonus game resulted in an increase in the time of eligibility.

ALTERNATIVE EMBODIMENTS

Alternative Embodiment A

A method of conducting a wagering game having a basic game and a bonus game, comprising the acts of: conducting a session of the basic game on a wagering game machine, including (i) receiving a wager to play the basic game on a wagering game machine; (ii) in response to the receiving of the wager, displaying a randomly selected outcome of the basic game; and (iii) awarding a basic award in response to the randomly selected outcome of the basic game being a winning basic game outcome; triggering the bonus game such that a player is eligible to be awarded a bonus award for a predetermined number of plays of the bonus game; and in response to the triggering, displaying a randomly selected outcome for each of the predetermined number of plays of the bonus game, wherein the session of the basic game is ongoing while the bonus game is triggered such that the ongoing session of the basic game allows a player to play the basic game while the player is eligible to be awarded one of the respective bonus awards for the predetermined number of the plays of the bonus game.

Alternative Embodiment B

The method of Alternative Embodiment A, wherein the session of the basic game is ongoing such that the wagering game machine is configured to receive wagers while the player is eligible to be awarded one of the respective bonus awards for the predetermined number of the plays of the bonus game.

Alternative Embodiment C

The method of Alternative Embodiment A, further comprising awarding a bonus award in response to one of the randomly selected outcomes of the predetermined number of plays of the bonus game being a winning bonus outcome.

Alternative Embodiment D

The method of Alternative Embodiment C, further comprising increasing the awarded bonus award based on a predetermined outcome of the basic game, the predetermined outcome of the basic game occurring during the execution of the predetermined number of the plays of the bonus game.

Alternative Embodiment E

The method of Alternative Embodiment A, further comprising extending the player's eligibility to be awarded a bonus award by adding an additional number of plays of the bonus game to the predetermined number of plays of the bonus game based on a predetermined outcome of the basic game occurring during the execution of the predetermined number of the plays of the bonus game.

Alternative Embodiment F

The method of Alternative Embodiment E, wherein the predetermined outcome of the basic game is a winning outcome, a predetermined symbol combination, or both.

Each of these embodiments and obvious variations thereof is contemplated as falling within the spirit and scope of the claimed invention, which is set forth in the following claims.

What is claimed is:

1. A method of conducting a wagering game having a basic game and a continuous bonus game, comprising:

continually displaying free plays of the continuous bonus game on a secondary display of a wagering game machine, the continually displaying free plays including displaying a randomly selected outcome for each of the free plays of the continuous bonus game, and for each winning outcome of the free plays of the continuous bonus game, displaying, on the secondary display, a respective bonus award of credits;

while continually displaying the free plays of the continuous bonus game, conducting a session of the basic game on a wagering game machine, including:

receiving a wager from a player to play the basic game on the wagering game machine;

in response to the receiving, displaying a randomly selected outcome of the basic game on a primary display of the wagering game machine during the displaying the randomly selected outcomes of the free plays of the continuous bonus game on the secondary display;

repeating the acts of receiving and displaying the randomly selected outcome of the basic game at least once; and in response to the randomly selected outcome of the basic game being a winning outcome, awarding a basic award of credits to the player;

triggering the bonus game such that the player is eligible to be awarded one of the respective bonus awards for a predetermined number of free plays of the continuous bonus game;

displaying the randomly selected outcome for one of the predetermined number of the free plays of the continuous bonus game;

and in response to the player being eligible and to the displayed randomly selected outcome for the one of the predetermined number of the free plays of the continuous bonus game being a winning outcome, providing the respective bonus award of credits associated with the one of the predetermined number of the free plays of the continuous bonus game to the player.

2. The method of claim 1, wherein the basic game is a first slots game and the continuous bonus game is a second slots game, the first slots game including a first plurality of reels and the second slots game including a second plurality of reels that is separate and distinct from the first plurality of reels.

3. The method of claim 1, wherein the triggering the bonus game pauses the session of the basic game.

4. The method of claim 1, wherein the session of the basic game is ongoing while the bonus game is triggered such that the ongoing session of the basic game allows a player to play the basic game while the player is eligible to be awarded one of the respective bonus awards for the predetermined number of the free plays of the continuous bonus game.

5. The method of claim 1, wherein the session ends in response to the player running out of credits or the player cashing out.

6. The method of claim 1, wherein the predetermined number of free plays of the continuous bonus game is equal to or greater than one free play.

7. A method of conducting a wagering game having a basic game and a continuous bonus game, comprising the acts of:

continually displaying a plurality of free plays of the continuous bonus game, the act of continually displaying the plurality of free plays including the act of displaying a randomly selected outcome for each of the plurality of free plays of the continuous bonus game;

providing a bonus award of credits to a player in response to one of the randomly selected outcomes of one of the free plays of the continuous bonus game being a winning bonus outcome;

while continually displaying the plurality of free plays of the continuous bonus game, conducting a session of the basic game on a wagering game machine, including:

(i) receiving a wager to play the basic game on the wagering game machine;

(ii) in response to the receiving of the wager, displaying a randomly selected outcome of the basic game; and (iii) providing a basic award of credits to the player in response to the randomly selected outcome of the basic game being a winning outcome, each of the winning outcomes of the free plays of the continuous bonus game having a bonus award of credits that is separate and distinct from a basic award of credits of each winning outcome of the basic game.

8. The method of claim 7, wherein the act of displaying the randomly selected outcome for each of the plurality of free plays of the continuous bonus game occurs contemporaneously with the displaying the randomly selected outcome of the basic game.

9. The method of claim 7, wherein the basic game is a first slots game, the first slots game including a first plurality of reels, each of the first plurality of reels including a first plurality of symbols.

10. The method of claim 9, wherein the continuous bonus game is a second slots game, the second slots game including a second plurality of reels, each of the second plurality of reels including a second plurality of symbols.

11. The method of claim 7, further comprising the act of triggering the bonus game from the basic game.

12. The method of claim 7, further comprising the acts of:

triggering a bonus game from the wagering game machine;

displaying the randomly selected outcome for one of the free plays of the continuous bonus game subsequent to the act of triggering the bonus game;

associating the randomly selected outcome for the one of the free plays of the continuous bonus game with the wagering game machine triggering the bonus game;

displaying a bonus award of credits associated with the one of the free plays of the continuous bonus game; and associating the displayed bonus award of credits with at least the wagering game machine that triggered the bonus game.

13. The method of claim 7, wherein the act of continually displaying the plurality of free plays further includes the act of displaying a respective bonus award of credits associated with each of the randomly selected outcomes of the plurality of free plays of the continuous bonus game.

14. The method of claim 13, wherein the displayed bonus awards of credits are provided only in response to an occurrence of a bonus award triggering event at the wagering game machine.

15. The method of claim 7, further comprising the act of triggering the bonus game such that the session of the basic game is paused.

16. The method of claim 7, wherein basic game and the continuous bonus game are displayed on separate portions of a single display unit.

17. The method of claim 7, wherein the basic game is displayed on a first display element associated with the wagering game machine and the continuous bonus game is displayed on a second display element associated with the wagering game machine.

18. The method of claim 17, wherein the second display element is separate from the wagering game machine.

19. A gaming system for playing a wagering game having a basic game and a continuous bonus game, comprising:

a secondary display for continually displaying free plays of a second plurality of symbols that continually indicate randomly selected outcomes for the continuous bonus game, one or more of the randomly selected outcomes for the continuous bonus game being a winning bonus game outcome, each winning bonus game outcome having a bonus award of credits;

an input device configured to receive a wager from a player;

a primary display for displaying a first plurality of symbols that indicate randomly selected outcomes for the basic game, one or more of the randomly selected outcomes for the basic game being a winning basic game outcome, each winning basic game outcome having a basic award of credits; and one or more controllers operative to:

(i) conduct the basic game on the primary display;

(ii) conduct the continuous bonus game on the secondary display;

(iii) provide the basic award of credits to the player based on the randomly selected outcomes for the basic game; and (iv) provide the bonus award of credits to the player responsive to both a bonus game triggering event in the basic game and a winning bonus game outcome in the continuous bonus game.

20. The gaming system of claim 19, wherein at least one of the one or more controllers is located within the gaming system.

21. The gaming system of claim 19, wherein the bonus award of credits is separate and distinct from the basic award of credits.

22. The gaming system of claim 19, wherein each of the randomly selected outcomes for the continuous bonus game is separate and distinct from each of the randomly selected outcomes for the basic game.

23. The gaming system of claim 19, wherein each winning outcome of the continuous bonus game has a bonus award of credits that is separate and distinct from a basic award of credits of each winning outcome of the basic game.

24. The gaming system of claim 19, wherein in response to a winning bonus game outcome being displayed on the secondary display, the one or more controllers are further operative to cause a representation of the bonus award of credits for that winning bonus game outcome to be displayed on the secondary display.

* * * * *